US009973602B2

(12) United States Patent
Iwabuchi

(10) Patent No.: US 9,973,602 B2
(45) Date of Patent: May 15, 2018

(54) ELECTRONIC APPARATUS

(71) Applicant: KYOCERA CORPORATION, Kyoto (JP)

(72) Inventor: Masaru Iwabuchi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/627,275

(22) Filed: Jun. 19, 2017

(65) Prior Publication Data

US 2017/0324851 A1 Nov. 9, 2017

Related U.S. Application Data

(63) Continuation of application No. PCT/JP2015/084556, filed on Dec. 9, 2015.

(30) Foreign Application Priority Data

Dec. 25, 2014 (JP) .................... 2014-261747

(51) Int. Cl.
*H04M 1/02* (2006.01)
*B32B 3/26* (2006.01)
(Continued)

(52) U.S. Cl.
CPC ........... *H04M 1/0266* (2013.01); *B32B 3/266* (2013.01); *B32B 7/08* (2013.01); *B32B 7/12* (2013.01); *B32B 2457/20* (2013.01)

(58) Field of Classification Search
CPC combination set(s) only.
See application file for complete search history.

(56) References Cited

U.S. PATENT DOCUMENTS

2002/0140667 A1* 10/2002 Horiki .................. G06F 1/1616
  345/156
2005/0023937 A1* 2/2005 Sashida ................ B06B 1/0611
  310/348
(Continued)

FOREIGN PATENT DOCUMENTS

JP 2014-057264 A 3/2014

OTHER PUBLICATIONS

International Search Report and Written Opinion dated Feb. 23, 2016 in counterpart Japanese Patent Application No. PCT/JP2015/084556, with Statement of Relevance of Non-English References.

*Primary Examiner* — Nay A Maung
*Assistant Examiner* — Erica Fleming-Hall
(74) *Attorney, Agent, or Firm* — Duane Morris LLP

(57) ABSTRACT

A piezoelectric vibrator is located on a first end portion of a second surface of a panel, and is configured to vibrate while being bent in a first direction, the first end portion extending in the first direction. A double-sided tape is located between the panel and a first case. An adhesive is located between the panel and the first case. The first end portion includes an element region, and has second and third end portions with the element region interposed between the second and third end portions. The second end portion faces the element region, and includes a first adhesive region. The double-sided tape is present between the first adhesive region and the element region, and is not present in a region located closer to an outer edge of the panel than the first adhesive region.

9 Claims, 9 Drawing Sheets

(51) Int. Cl.
  *B32B 7/08* (2006.01)
  *B32B 7/12* (2006.01)

(56) References Cited

U.S. PATENT DOCUMENTS

| | | | | |
|---|---|---|---|---|
| 2006/0170305 A1* | 8/2006 | Ohshima | ............ | H03H 3/04 310/311 |
| 2008/0037819 A1* | 2/2008 | Yang | ............ | H04R 17/00 381/395 |
| 2010/0308928 A1* | 12/2010 | Aratake | ............ | H03H 9/1021 331/116 R |
| 2011/0255378 A1* | 10/2011 | Funabiki | ............ | H03H 9/1021 368/47 |
| 2012/0056826 A1* | 3/2012 | Kim | ............ | G06F 3/016 345/173 |
| 2012/0247291 A1* | 10/2012 | Kawada | ............ | C03B 33/0222 83/33 |
| 2014/0085243 A1* | 3/2014 | Miki | ............ | H01L 41/042 345/173 |
| 2015/0117683 A1* | 4/2015 | Ozasa | ............ | B06B 1/0603 381/190 |
| 2015/0255701 A1* | 9/2015 | Kobayashi | ............ | H01L 41/053 310/344 |
| 2015/0318462 A1* | 11/2015 | Kim | ............ | G06F 3/016 310/332 |
| 2016/0190426 A1* | 6/2016 | Kobayashi | ............ | H03H 9/21 310/348 |
| 2017/0179366 A1* | 6/2017 | Kobayashi | ............ | H01L 41/047 |
| 2017/0257707 A1* | 9/2017 | Shimoda | ............ | H04R 17/00 |
| 2017/0288522 A1* | 10/2017 | Noto | ............ | H03H 3/02 |
| 2017/0302242 A1* | 10/2017 | Noto | ............ | H03H 3/04 |

\* cited by examiner

F I G . 1
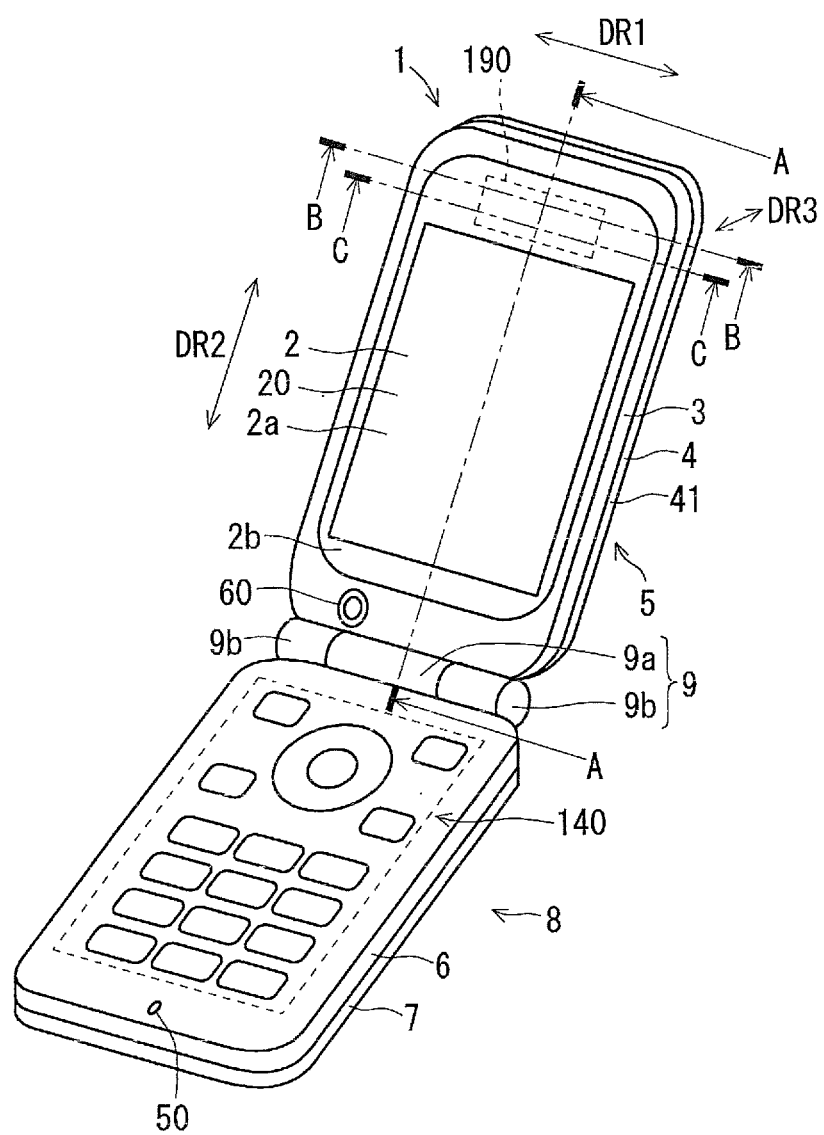

F I G . 2
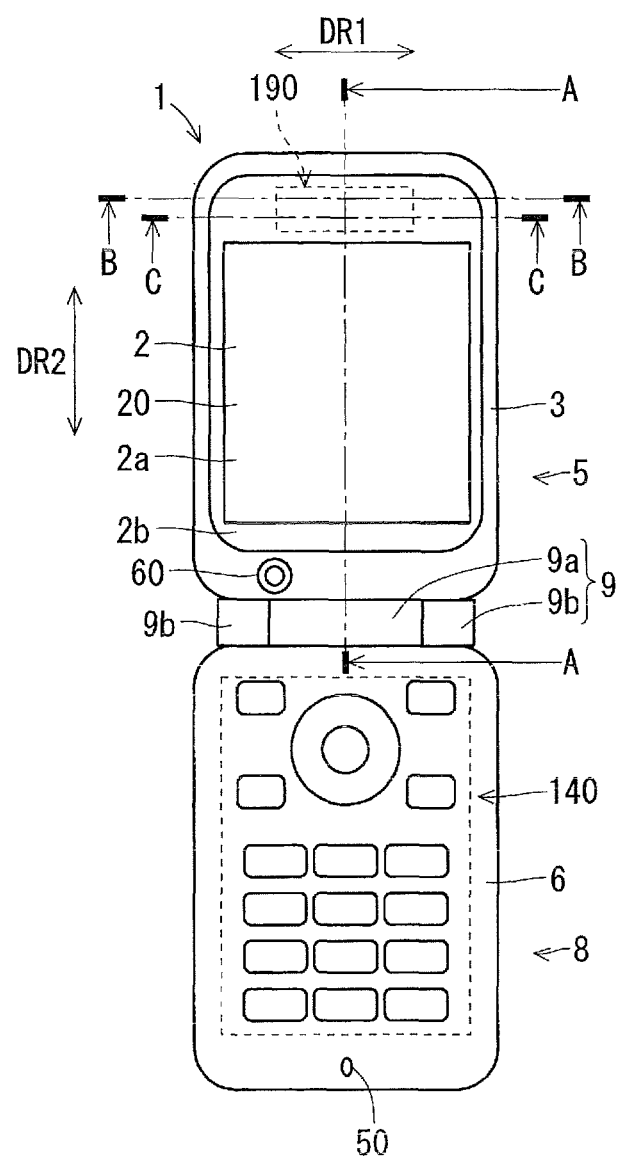

US 9,973,602 B2

ELECTRONIC APPARATUS

CROSS-REFERENCE TO RELATED APPLICATION

The present application is a continuation based on PCT Application No. PCT/JP 2015/084556 filed on Dec. 9, 2015, which claims the benefit of Japanese Application No. 2014-261747, filed on Dec. 25, 2014. PCT Application No. PCT/JP2015/084556 is entitled "ELECTRONIC INSTRUMENT" and Japanese Application No. 2014-261747 is entitled "ELECTRONIC APPARATUS". The contents of which are incorporated by reference herein in their entirety.

FIELD

Embodiments of the present disclosure relate to an electronic apparatus.

BACKGROUND

Various technologies have conventionally been proposed for electronic apparatuses.

SUMMARY

An electronic apparatus is disclosed. In one embodiment, an electronic apparatus comprises a panel, a piezoelectric vibrator, a first case, a double-sided tape, and an adhesive. The panel includes a first surface and a second surface opposite to the first surface. The piezoelectric vibrator is located on a first end portion of the second surface, and is configured to vibrate while being bent in a first direction, the first end portion extending in the first direction. The first case faces the panel, the panel being attached to the first case. The double-sided tape is located between the panel and the first case, and is configured to bond the panel to the first case. The adhesive is located between the panel and the first case, and is configured to bond the panel to the first case. The first end portion includes an element region where the piezoelectric vibrator is present, and includes second and third end portions in the first direction with the element region interposed between the second and third end portions. The second end portion faces the element region in the first direction, and includes a first adhesive region where the adhesive is present. The double-sided tape is present between the first adhesive region and the element region, and is not present in a region located closer to an outer edge of the panel than the first adhesive region.

BRIEF DESCRIPTION OF THE DRAWINGS

FIG. 1 illustrates a perspective view of an external appearance of an electronic apparatus.

FIG. 2 illustrates a plan view of the external appearance of the electronic apparatus in an open state.

DETAILED DESCRIPTION

External Appearance of Electronic Apparatus

Figure 3:
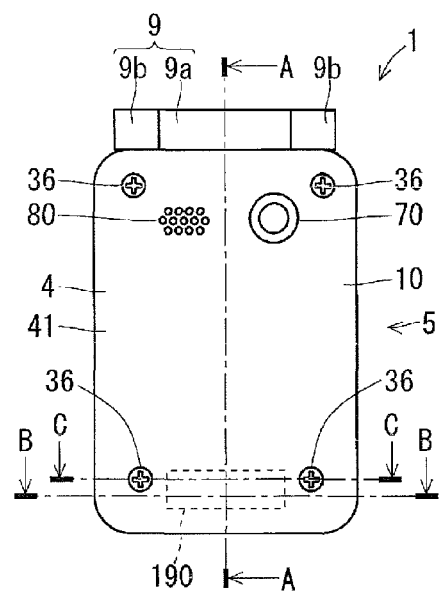
FIG. 3 illustrates a plan view of the external appearance of the electronic apparatus in a closed state.

FIG. 1 illustrates a perspective view of an external appearance of an electronic apparatus 1. The electronic apparatus 1 is, for example, a folding mobile phone. As illustrated in FIG. 1, the electronic apparatus 1 includes a display housing 5 and an operation unit housing 8. The display housing 5 and the operation unit housing 8 include a hinge 9a and a hinge 9b that form a hinge part 9. The display housing 5 and the operation unit housing 8 are connected to each other at the hinge part 9. The electronic apparatus 1 can be pivotally opened and closed about the hinge part 9. Hereinafter, a state in which the electronic apparatus 1 is opened will be also referred to as an "open state". On the other hand, a state in which the electronic apparatus 1 is closed will be also referred to as a "closed state".

FIG. 2 and FIG. 3 respectively illustrate a plan view of the external appearance of the electronic apparatus 1 in the open state and a plan view of the external appearance of the electronic apparatus 1 in the closed state. Each of the display housing 5 and the operation unit housing 8, except for the hinge 9a and the hinge 9b thereof is formed into a substantially rectangular plate shape. In the closed state of the electronic apparatus 1, the display housing 5 and the operation unit housing 8 overlap each other, and the respective outlines thereof substantially correspond to each other. Sectional structures of the electronic apparatus 1, taken along lines indicated by arrows A-A, B-B, and C-C will be described later in detail.

The display housing 5 includes a cover panel 2, a front-side case 3 to which the cover panel 2 is bonded, and a rear-side case 4 to be attached to the front-side case 3. As illustrated in FIG. 3, the rear-side case 4 is attached to the front-side case 3 from a rear surface 10 of the display housing 5, by an adhesive and a plurality of screws 36. In the example illustrated in FIG. 3, four screws 36 are used for attaching the rear-side case 4 to the front-side case 3. Each of the cover panel 2, the front-side case 3, and the rear-side case 4 forms a part of an exterior of the display housing 5.

The operation unit housing 8 includes a front-side case 6 and a rear-side case 7 to be attached to the front-side case 6.

The cover panel 2 forms a front surface portion of the display housing 5, except a circumferential edge portion of the front surface portion. The front-side case 3 and the rear-side case 4 form the circumferential edge portion of the front surface portion, a side surface portion, and a rear surface portion of the display housing 5.

Each of the front-side cases 3, 6 and the rear-side cases 4, 7 is formed of, for example, resin. Examples of the resin may include polycarbonate resin, acrylonitrile butadiene styrene (ABS) resin, and nylon-based resin.

The cover panel 2 has a substantially rectangular plate shape in a plan view. The cover panel 2 has a first main surface 20 forming a part of the front surface of the display housing 5, and a second main surface 21 located opposite to the first main surface 20 (see FIG. 10 to be described later). Hereinafter, the first main surface 20 will be sometimes referred to as an "outer main surface 20", and the second main surface 21 will be sometimes referred to as an "inner main surface 21".

Further, the cover panel 2 has the substantially rectangular shape with a side extending in a first direction DR1 parallel to the outer main surface 20 and the inner main surface 21 defined as a width (shorter side). Accordingly, assuming that a direction parallel to the outer main surface 20 and the inner main surface 21 and perpendicular to the first direction DR1 is defined as a second direction DR2, a length of the cover panel 2 extending in the second direction DR2 is larger than a length of the cover panel 2 extending in the first direction DR1. In addition, it is assumed that a direction perpendicular to the outer main surface 20 and the inner main surface 21 is defined as a third direction DR3. Hereinafter, the first direction DR1, the second direction DR2, and the third direction DR3 will be sometimes referred to as a "widthwise direction DR1", a "lengthwise direction DR2", and a "thickness direction DR3", respectively.

The cover panel 2 is formed of a transparent material. For example, the cover panel 2 is formed of acrylic resin. The cover panel 2 may be formed of glass, sapphire, or the like. Here, sapphire refers to a single crystal mainly composed of alumina ($Al_2O_3$). In this description, sapphire refers to a single crystal in which a purity of $Al_2O_3$ is not lower than approximately 90%. It is preferable that the purity of $Al_2O_3$ be not lower than 99% from the viewpoints of increasing resistance to damages and reducing chipping or cracking with higher reliability.

Further, the cover panel 2 may be a composite panel with a multilayer structure including a sapphire layer (hereinafter, such a composite panel will be sometimes referred to as a "laminated panel"). For example, the cover panel 2 may be a laminated panel with a two-layer structure including a sapphire layer formed on a surface of the electronic apparatus 1 (hereinafter, such a sapphire layer will be sometimes referred to as a "sapphire panel"), and a glass layer affixed to the sapphire panel (hereinafter, such a glass layer will be sometimes referred to as a "glass panel"). The cover panel 2 may also be a laminated panel with a three-layer structure including a first sapphire panel formed on a surface of the electronic apparatus 1, a glass panel affixed to the first sapphire panel, and a second sapphire panel affixed to the glass panel.

Moreover, the cover panel 2 may include a layer formed of a crystalline material other than sapphire, such as diamond, zirconia, titania, crystal, lithium tantalite, or aluminum oxynitride. With regard to these materials, a single crystal with a purity of not lower than approximately 90% is preferable from the viewpoints of increasing resistance to damages and reducing chipping or cracking with higher reliability.

The cover panel 2 includes a transparent display region 2a (also referred to as a "display window") through which matters displayed on a display 120 (to be described later) pass. The display region 2a has, for example, a rectangular shape in a plan view. Visible light output from the display 120 is taken out outside the electronic apparatus 1 through the display region 2a. A user of the electronic apparatus 1 is able to visually recognize information displayed on the display 120 through the display region 2a, from the outside of the electronic apparatus 1.

Most of a circumferential edge portion 2b, which surrounds the display region 2a, of the cover panel 2 is in a black color in such a manner that, for example, a film or the like is affixed thereto. Thus, most of the circumferential edge portion 2b serves as a non-display portion that prevents matters displayed on the display 120 from passing therethrough.

A piezoelectric vibrator 190 is located on an upper end portion of the inner main surface 21 of the cover panel 2.

An operation unit 140 including a plurality of operation keys is provided on a front surface of the operation unit housing 8. A microphone hole 50 is formed in a lower end portion of the front surface of the operation unit housing 8. A speaker hole 80 is formed in the rear surface 10 of the display housing 5.

Provided inside the display housing 5 are a plurality of components such as the display 120, a front imaging unit 160, a rear imaging unit 170, and an external speaker 180 which will be later described.

Provided on a lower end portion of the front surface of the display housing 5 is a transparent portion 60 for a front lens, for allowing an imaging lens of the front imaging unit 160 in the display housing 5 to be visually recognized from the outside of the electronic apparatus 1. Provided on the rear surface 10 of the display housing 5 is a transparent portion 70 for a rear lens, for allowing an imaging lens of the rear imaging unit 170 in the display housing 5 to be visually recognized from the outside of the electronic apparatus 1.

Electrical Configuration of Electronic Apparatus

Figure 4:
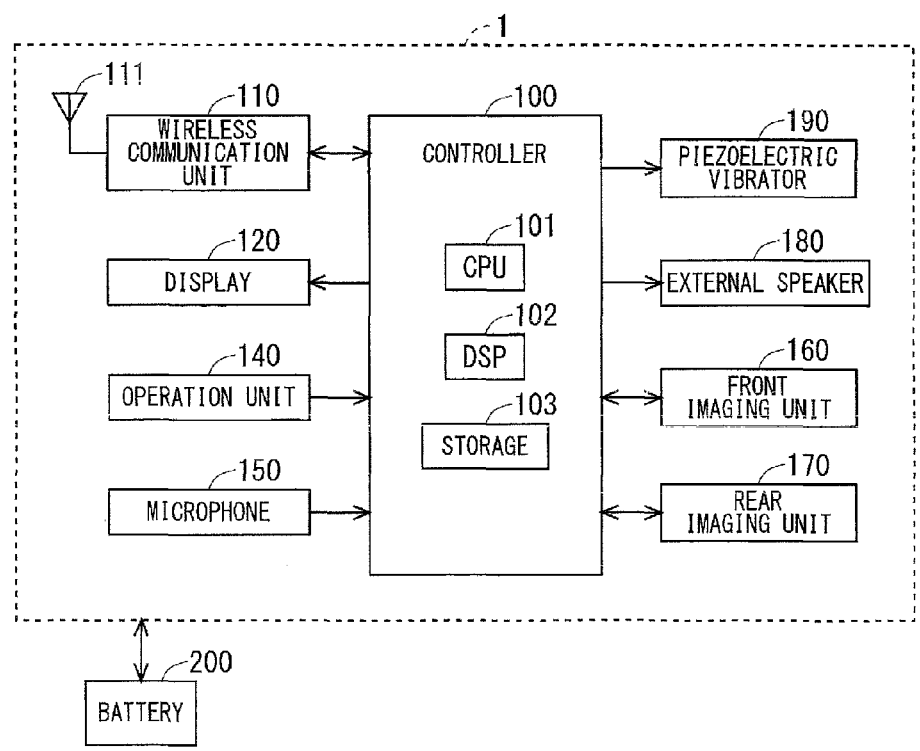
FIG. 4 illustrates an electrical configuration of the electronic apparatus.

FIG. 4 illustrates a block diagram chiefly illustrating an electrical configuration of the electronic apparatus 1. As illustrated in FIG. 4, the electronic apparatus 1 includes a controller 100, a wireless communication unit 110, the display 120, the operation unit 140, a microphone 150, the front imaging unit 160, the rear imaging unit 170, the external speaker 180, the piezoelectric vibrator 190, and a battery 200. Each of the constituents in the electronic apparatus 1 is housed in either the display housing 5 or the operation unit housing 8.

The controller 100 is a kind of computer, and includes a central processing unit (CPU) 101, a digital signal processor (DSP) 102, a storage 103, and the like. The controller 100 can manage the operation of the electronic apparatus 1 in a centralized manner by controlling the other constituents of the electronic apparatus 1.

The storage 103 comprises a non-transitory recording medium, such as a read only memory (ROM) or a random access memory (RAM), which is readable by the CPU 101 and the DSP 102. The storage 103 stores a main program which is a control program for controlling the electronic apparatus 1, more specifically, for controlling the respective constituents such as the wireless communication unit 110 and the display 120 of the electronic apparatus 1. The storage 103 also stores a plurality of application programs, and the like. Various functions of the controller 100 are implemented when the CPU 101 and the DSP 102 execute various programs in the storage 103.

The storage 103 may include a non-transitory recording medium which is readable by other computers than the ROM and the RAM. The storage 103 may include, for example, a small-size hard disk drive, a solid state drive (SSD), and the like.

The wireless communication unit 110 includes an antenna 111. In the wireless communication unit 110, the antenna 111 can receive a signal from a mobile phone different from the electronic apparatus 1, or from a communication device such as a web server connected to the Internet, via a base station. The wireless communication unit 110 can perform an amplification process and down conversion on the received signal, and can output the signal to the controller 100. The controller 100 can perform demodulation or the like on the input signal, and can acquire a sound signal indicating a voice or music included in the received signal.

The wireless communication unit 110 can perform up-converting and the amplification process on a transmission signal including a sound signal or the like generated in the controller 100, and can wirelessly transmit the transmission signal after the process from the antenna 111. The transmission signal from the antenna 111 can be received in a communication device connected to the Internet or a mobile phone different from the electronic apparatus 1, via the base station.

The display 120 is, for example, a liquid crystal display and an organic electroluminescent (EL) display. The display 120 can display various pieces of information such as characters, symbols, figures, and images by control of the controller 100. The information displayed on the display 120 can be visually recognized by the user of the electronic apparatus 1 through the display region 2a of the cover panel 2.

The operation unit 140 can output an electrical operation signal indicating that an operation key is manipulated, to the controller 100, in response to press of the operation key. Thus, the controller 100 can determine whether each of the operation keys of the operation unit 140 is manipulated. The user of the electronic apparatus 1 is able to give various instructions to the electronic apparatus 1 by manipulating the operation unit 140.

The front imaging unit 160 includes an imaging lens, an image sensor, and the like. The front imaging unit 160 can image a still image and a moving image based on the control by the controller 100. The imaging lens of the front imaging unit 160 can be visually recognized from the transparent portion 60 on the front surface of the display housing 5. Accordingly, the front imaging unit 160 can image an object which is present on the side of the front surface of the electronic apparatus 1, that is, on the side of the outer main surface 20 of the cover panel 2.

The rear imaging unit 170 includes an imaging lens, an image sensor, and the like. The rear imaging unit 170 can image a still image and a moving image based on the control by the controller 100. The imaging lens of the rear imaging unit 170 can be visually recognized from the transparent portion 70 on the rear surface 10 of the display housing 5. Accordingly, the rear imaging unit 170 can image an object which is present on the side of the rear surface 10 of the display housing 5.

The microphone 150 can convert a sound received from the outside of the electronic apparatus 1, such as a voice produced by the user in telephone conversation, into an electric sound signal, and can output the sound signal to the controller 100. The sound from the outside of the electronic apparatus 1 is captured into the electronic apparatus 1 through the microphone hole 50 formed in the front surface of the operation unit housing 8, and then is input to the microphone 150. The microphone hole 50 may be formed in a side surface of the operation unit housing 8 or in a rear surface of the operation unit housing 8. Otherwise, the microphone hole 50 may be formed in the display housing 5.

The external speaker 180 is, for example, a dynamic speaker. The external speaker 180 can convert an electric sound signal received from the controller 100, into a sound, and can output the sound. The sound from the external speaker 180 is output to the outside through the speaker hole 80 formed in the rear surface 10 of the display housing 5. As for the sound output through the speaker hole 80, the volume is set to a degree such that the user can hear the sound at a location separated from the electronic apparatus 1. The external speaker 180 outputs, for example, a ring tone. The speaker hole 80 may be formed in the front surface or side surface of the display housing 5. Otherwise, the speaker hole 80 may be formed in the operation unit housing 8.

The piezoelectric vibrator 190 is located on the inner main surface 21 of the cover panel 2 provided on the front surface of the display housing 5. The piezoelectric vibrator 190 is caused to vibrate by a drive voltage applied from the controller 100. The controller 100 can generate the drive voltage based on a sound signal, and can apply the drive voltage to the piezoelectric vibrator 190. When the piezoelectric vibrator 190 is caused to vibrate by the controller 100 in accordance with the sound signal, the cover panel 2 vibrates in accordance with the sound signal. Consequently, a reception sound is transmitted from the cover panel 2 to the user of the electronic apparatus 1. The volume of the reception sound is set to a degree such that the user of the electronic apparatus 1 can adequately hear the reception sound when the user brings his/her ear close to the cover panel 2. The reception sound transmitted from the cover panel 2 to the user of the electronic apparatus 1 will be described later in detail.

The battery 200 can output power for the electronic apparatus 1. The power output from the battery 200 is supplied to each of the electronic components of the controller 100, wireless communication unit 110, and the like in the electronic apparatus 1.

Details of Piezoelectric Vibrator

Figure 5:
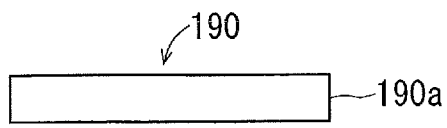
FIG. 5 illustrates atop view of a structure of a piezoelectric vibrator.
Figure 6:
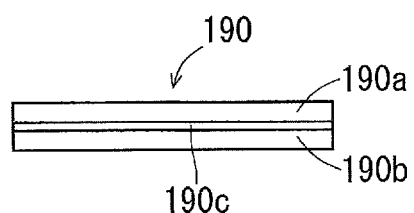
FIG. 6 illustrates a side view of the structure of the piezoelectric vibrator.

FIG. 5 and FIG. 6 respectively illustrate a top view and a side view of a structure of the piezoelectric vibrator 190. As illustrated in FIGS. 5 and 6, the piezoelectric vibrator 190 has a long shape in one direction. Specifically, the piezoelectric vibrator 190 has a long and narrow rectangular plate shape in a plan view. The piezoelectric vibrator 190 has, for example, a bimorph structure. The piezoelectric vibrator 190 includes a first piezoelectric ceramic plate 190a and a second piezoelectric ceramic plate 190b which are bonded to each other with a shim material 190c interposed therebetween.

In the piezoelectric vibrator 190, when a positive voltage is applied to the first piezoelectric ceramic plate 190a and a negative voltage is applied to the second piezoelectric ceramic plate 190b, the first piezoelectric ceramic plate 190a extends in the lengthwise direction, and the second piezoelectric ceramic plate 190b contracts in the lengthwise direction. Accordingly, as illustrated in FIG. 7, the piezoelectric vibrator 190 is bent into a convex with the first piezoelectric ceramic plate 190a being the outside.

In contrast, in the piezoelectric vibrator 190, when a negative voltage is applied to the first piezoelectric ceramic plate 190a and a positive voltage is applied to the second piezoelectric ceramic plate 190b, the first piezoelectric ceramic plate 190a contracts in the lengthwise direction, and the second piezoelectric ceramic plate 190b extends in the lengthwise direction. Accordingly, as illustrated in FIG. 8, the piezoelectric vibrator 190 is bent into a convex with the second piezoelectric ceramic plate 190b being the outside.

Figure 7:
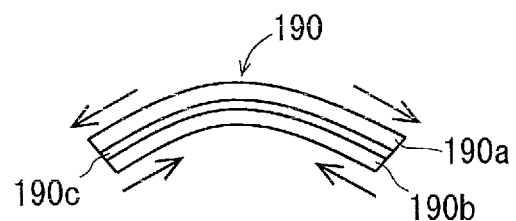
FIG. 7 illustrates how the piezoelectric vibrator vibrates while being bent.
Figure 8:
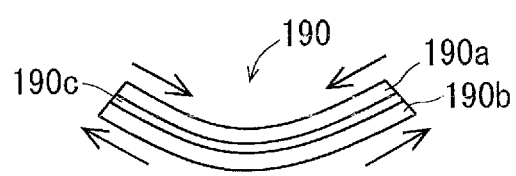
FIG. 8 illustrates how the piezoelectric vibrator vibrates while being bent.

The piezoelectric vibrator 190 vibrates while being bent in the lengthwise direction by alternately taking the state of FIG. 7 and the state of FIG. 8. The controller 100 allows the piezoelectric vibrator 190 to vibrate while being bent in the lengthwise direction by applying an alternating current (AC) voltage in which a positive voltage and a negative voltage alternately appear at an area between the first piezoelectric ceramic plate 190a and the second piezoelectric ceramic plate 190b.

The piezoelectric vibrator 190 having the above-described structure is disposed on the circumferential edge of the inner main surface 21 of the cover panel 2. Specifically, the piezoelectric vibrator 190 is disposed on a central portion in the widthwise direction DR1 of the cover panel 2, on the upper end portion of the inner main surface 21 of the cover panel 2. The piezoelectric vibrator 190 is also disposed such that the lengthwise direction thereof extends in the widthwise direction DR1 of the cover panel 2. The piezoelectric vibrator 190 thus vibrates while being bent in the widthwise direction DR1 of the cover panel 2. A center in the lengthwise direction of the piezoelectric vibrator 190 corresponds to a center in the widthwise direction DR1 on the upper end portion of the inner main surface 21 of the cover panel 2.

As illustrated in FIGS. 7 and 8, in the piezoelectric vibrator 190 that vibrates while being bent, the center in the lengthwise direction has the largest displacement amount of bending and vibrating. Accordingly, the center in the lengthwise direction of the piezoelectric vibrator 190 corresponds to the center in the widthwise direction DR1 on the upper end portion of the inner main surface 21 of the cover panel 2, so that a portion having the largest displacement amount of bending and vibrating in the piezoelectric vibrator 190 when the piezoelectric vibrator 190 vibrates while being bent corresponds to the center in the widthwise direction DR1 on the upper end portion of the inner main surface 21 of the cover panel 2.

Although only one structure including the first piezoelectric ceramic plate 190a and the second piezoelectric ceramic plate 190b which are bonded to each other with the shim material 190c interposed therebetween is provided for the piezoelectric vibrator 190 described above and illustrated in FIGS. 5 to 8, a plurality of those structures may be stacked. In such a case, the number of layers in the multilayer structure of the piezoelectric vibrator 190 is preferably not smaller than 28, more preferably not smaller than 44. The piezoelectric vibrator 190 can thus transmit sufficient vibration to the cover panel 2.

The piezoelectric vibrator 190 may be formed of an organic piezoelectric material such as polyvinylidene fluoride or a polylactic acid, in addition to a piezoelectric ceramic material. Specifically, the piezoelectric vibrator 190 may include first and second piezoelectric plates which are stacked and are formed of a polylactic acid film. A transparent electrode such as indium-tin-oxide (ITO) can be used for an electrode provided in the piezoelectric plates.

Generation of Reception Sound

The piezoelectric vibrator 190 causes the cover panel 2 to vibrate, so that an air conduction sound and a tissue conducted sound are transmitted from the cover panel 2 to the user of the electronic apparatus 1. In other words, a vibration of the piezoelectric vibrator 190 itself is transmitted to the cover panel 2, so that the air conduction sound and the tissue conducted sound are transmitted from the cover panel 2 to the user.

Here, the air conduction sound is a sound recognized in the human brain by the vibrations of an eardrum due to a sound wave (air vibration) which enters into an external auditory meatus hole (a so-called "ear hole"). On the other hand, the tissue conducted sound is a sound recognized in the human brain by the vibration of the eardrum due to the vibration of an auricle transmitted to the eardrum. Hereinafter, the air conduction sound and the tissue conducted sound will be described in detail.

Figure 9:
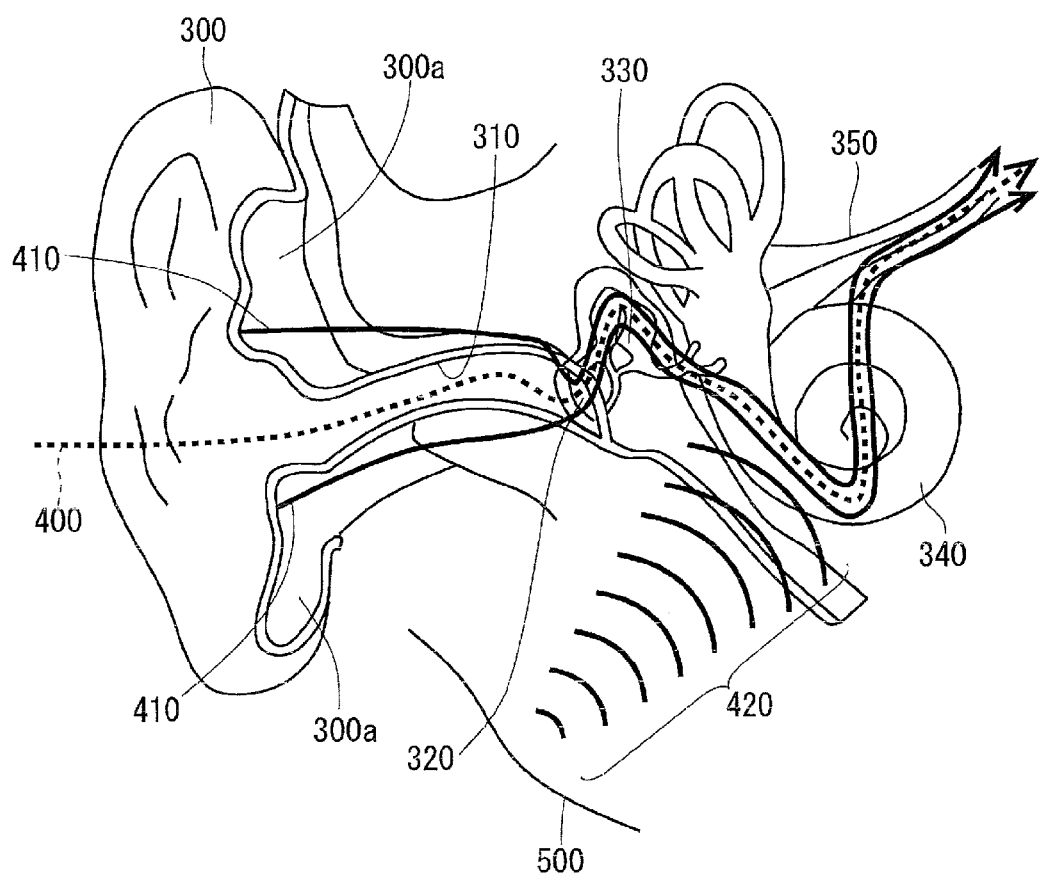
FIG. 9 illustrates an air conduction sound and a tissue conducted sound.

FIG. 9 illustrates the air conduction sound and the tissue conducted sound. FIG. 9 illustrates the structure of the ear of the user of the electronic apparatus 1. In FIG. 9, a dotted line 400 indicates a conduction path of a sound signal (sound information), while the air conduction sound is recognized in the human brain. A solid line 410 indicates a conduction path of a sound signal while the tissue conducted sound is recognized in the human brain.

When the piezoelectric vibrator 190 mounted on the cover panel 2 vibrates based on the electric sound signal indicating the reception sound, the cover panel 2 vibrates, and a sound wave is output from the cover panel 2. When the user moves the cover panel 2 of the electronic apparatus 1 to an auricle 300 of the user by holding the electronic apparatus 1 in a hand, or the cover panel 2 is brought into contact with the auricle 300 of the user, the sound wave output from the cover panel 2 enters an external auditory meatus hole 310 of the user. The sound wave from the cover panel 2 travels through the external auditory meatus hole 310, and causes an eardrum 320 to vibrate. The vibration of the eardrum 320 is transmitted to an auditory ossicle 330, and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350, and the reception sound is recognized in the brain. In this manner, the air conduction sound is transmitted from the cover panel 2 to the user of the electronic apparatus 1.

Further, when the user puts the cover panel 2 to the auricle 300 of the user by holding the electronic apparatus 1 in a hand, the auricle 300 is vibrated by the cover panel 2, which is vibrated by the piezoelectric vibrator 190. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain through the acoustic nerve 350, and the reception sound is recognized in the brain. In this manner, the tissue conducted sound is transmitted from the cover panel 2 to the user of the electronic apparatus 1. FIG. 9 illustrates an auricle cartilage 300a in the inside of the auricle 300.

A bone conduction sound is a sound recognized in the human brain by the vibration of the skull and direct stimulation of the inner ear such as the cochlea 340 caused by the vibration of the skull. In FIG. 9, in a case where a jawbone 500 vibrates, the transmission path of the sound signal while the bone conduction sound is recognized in the brain is indicated by a plurality of arcs 420.

As described above, the piezoelectric vibrator 190 causes the cover panel 2 provided on the front surface of the display housing 5 to adequately vibrate, so that the air conduction sound and the tissue conducted sound can be transmitted from the cover panel 2 to the user of the electronic apparatus 1. The user can hear the air conduction sound from the cover panel 2 by bringing the auricle 300 close to the cover panel 2. The user can also hear the air conduction sound and the tissue conducted sound from the cover panel 2 by bringing the auricle 300 into contact with the cover panel 2. The structure of the piezoelectric vibrator 190 is elaborately designed so that the air conduction sound and the tissue conducted sound can be adequately transmitted to the user of the electronic apparatus 1. Various advantages can be produced by configuring the electronic apparatus 1 such that the air conduction sound and the tissue conducted sound can be adequately transmitted to the user.

For example, since the user can hear the sound simply by putting the cover panel 2 to his/her ear, the user can have conversation with little attention to the position of his/her ear relative to the electronic apparatus 1.

In a high-noise environment, the user can reduce ambient noise while increasing the volume of the tissue conducted sound by strongly pressing his/her ear against the cover panel 2. Therefore, the user can adequately have conversation even in such a high-noise environment.

Further, even with an earplug or an earphone on the ear of the user, the user can recognize the reception sound from the electronic apparatus 1 by putting the cover panel 2 to the ear, more particularly, to the auricle 300. Moreover, even with a headphone on the ear of the user, the user can recognize the reception sound from the electronic apparatus 1 by putting the cover panel 2 to the headphone.

In addition, a portion of the cover panel 2, where the piezoelectric vibrator 190 is mounted, can vibrate relatively easily. Thus, the user can more easily hear the sound from the cover panel 2 by bringing his/her ear close to or pressing his/her ear against the upper end portion of the cover panel 2, where the piezoelectric vibrator 190 is mounted, more particularly, the central portion in the widthwise direction DR1 on the upper end portion.

Inner Structure of Electronic Apparatus

Figure 10:
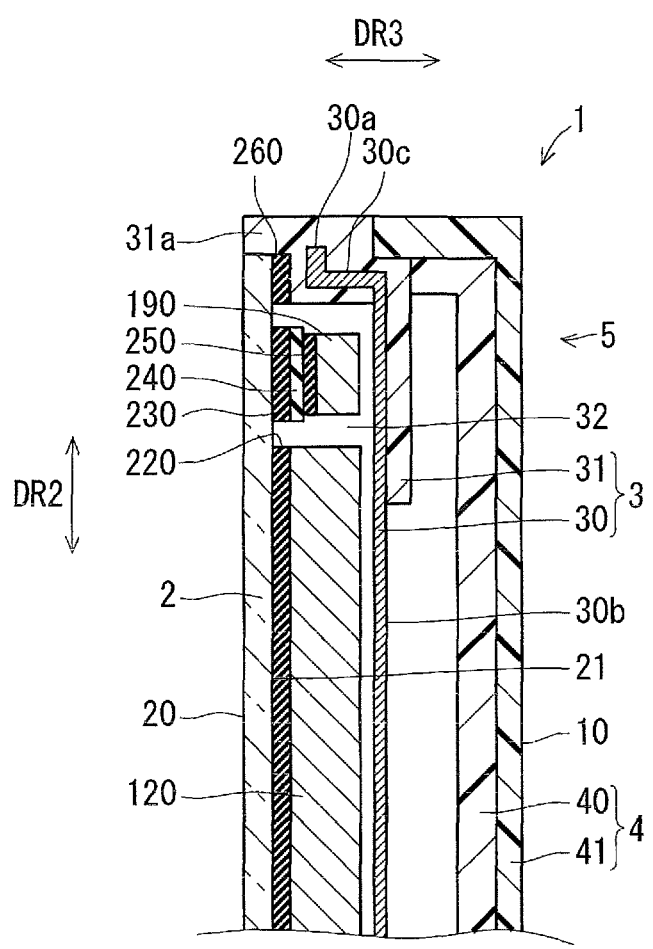
FIG. 10 illustrates a sectional structure of a display housing.
Figure 11:
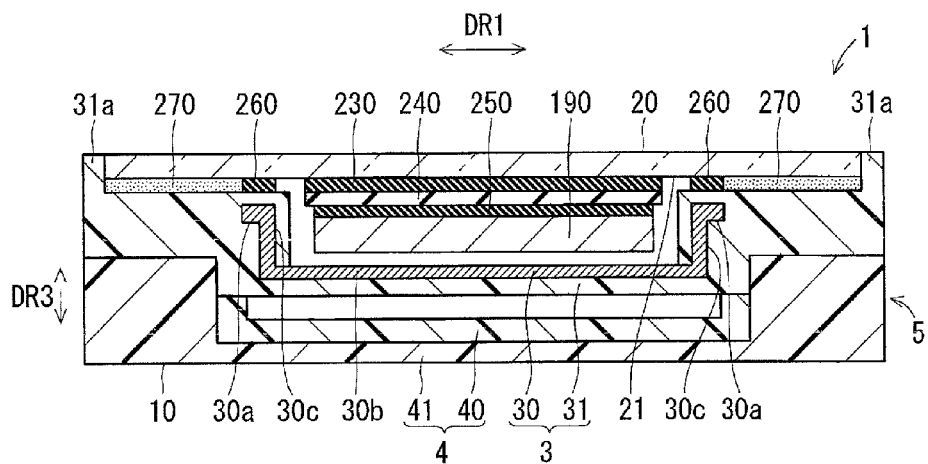
FIG. 11 illustrates a sectional structure of the display housing.
Figure 12:
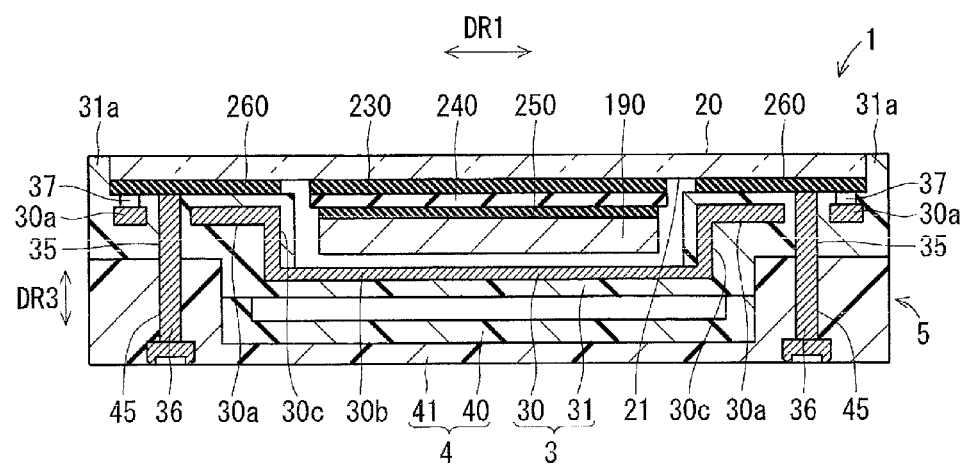
FIG. 12 illustrates a sectional structure of the display housing.

An inner structure of the electronic apparatus 1 will be described below. FIG. 10 illustrates a sectional view of the display housing 5, taken along a line indicated by arrows A-A in FIGS. 1 to 3. FIGS. 11 and 12 illustrate sectional views of the display housing 5, taken along lines indicated by arrows B-B and arrows C-C in FIGS. 1 to 3, respectively. In the illustrations of FIGS. 10 to 12, a part of components of the electronic apparatus 1, such as a plurality of wires for electrically connecting a plurality of electronic components to each other, is omitted for the sake of brevity in the drawings.

As illustrated in FIGS. 10 to 12, the cover panel 2 is bonded to the front-side case 3 by a double-sided tape 260 and an adhesive 270. A peripheral portion 31a of a front surface of the front-side case 3 protrudes in the thickness direction DR3. The cover panel 2 is bonded to the front-side case 3 while being surrounded by the peripheral portion 31a of the front-side case 3. For example, all the circumferential edge of a circumferential edge portion of the inner main surface 21 of the cover panel 2 are bonded to the front-side case 3 by the double-sided tape 260. The display 120 and the piezoelectric vibrator 190 are provided on the inner main surface 21 of the cover panel 2.

The front-side case 3 includes a sheet metal 30 for increasing stiffness of the front-side case 3, and a resin portion 31. The sheet metal 30 is formed integrally with the resin portion 31 by insert molding. The front-side case 3 includes a holder 32 having a recessed surface facing the inner main surface 21 of the cover panel 2. In bonding the cover panel 2 to the front-side case 3, the display 120 and the piezoelectric vibrator 190 are held in the holder 32.

The rear-side case 4 includes a case body 40 and a cover member 41. The cover member 41 is attached to the case body 40 from the rear surface 10 of the display housing 5. The cover member 41 is attached so as to cover the case body 40. The front-side case 3 and the rear-side case 4 are bonded to each other by an adhesive, a pressure-sensitive adhesive, or the like not illustrated in the drawings.

As illustrated in FIG. 12, the front-side case 3 includes screw holes 35 penetrating in the thickness direction DR3. The cover member 41 also includes screw holes 45 penetrating in the thickness direction DR3 and corresponding to the respective screw holes 35. For example, four screw holes 35 are formed in the respective four corners of the front-side case 3 in a plan view, and four screw holes 45 are formed in the respective four corners of the cover member 41 in a plan view. Accordingly, four pairs of screw holes, each pair including one screw hole 35 and one screw hole 45, are formed. The four screws 36 are inserted into the respective four pairs of screw holes from the rear surface 10 of the display housing 5. The four screws 36 reinforce the attachment of the rear-side case 4 to the front-side case 3. Alternatively, the four screws 36 may be inserted into the respective four pairs of screw holes from the outer main surface 20 of the cover panel 2.

Provided in a space surrounded by the front-side case 3 and the rear-side case 4 are components of the electronic apparatus 1, such as the front imaging unit 160, the rear imaging unit 170, and the external speaker 180 which are not illustrated.

The sheet metal 30 includes a main portion 30b, an erect portion 30c, and a flange 30a. The main portion 30b has a plate shape and is disposed in parallel to the inner main surface 21 of the cover panel 2. The main portion 30b faces the display 120 and the piezoelectric vibrator 190. The erect portion 30c stands on a circumferential end of the main portion 30b so as to surround the main portion 30b. The erect portion 30c extends from the circumferential end of the main portion 30b toward the cover panel 2. The flange 30a extends in parallel to the inner main surface 21 of the cover panel 2 from one end, which is opposite to the other end located closer to the main portion 30b, of the two ends of the erect portion 30c in the thickness direction DR3. The flange 30a is provided so as to surround the main portion 30b in a plan view, and faces a circumferential end of the cover panel 2. Major parts of the flange 30a and the erect portion 30c are buried in the resin portion 31. In the main portion 30b, a major part of the circumferential end is buried in the resin portion 31, and the remaining part is exposed from the resin portion 31.

The sheet metal 30 not only serves to increase stiffness of the front-side case 3, but also functions as a shield plate for protection against static electricity in the electronic apparatus 1. The sheet metal 30 is connected at a reference potential of the electronic apparatus 1. As illustrated in FIG. 12, a plurality of exposure holes 37 formed in a surface, which is located closer to the cover panel 2, of the front-side case 3 allows a part of the flange 30a of the sheet metal 30 to be exposed from the resin portion 31. A current caused due to static electricity generated when the user of the electronic apparatus 1 touches the electronic apparatus 1 easily flows toward the sheet metal 30 which is exposed through the exposure holes 37. Hence, it is possible to prevent electrostatic breakdown of electronic components such as the display 120 of the electronic apparatus 1. It is preferable that the exposure holes 37 expose a part of the sheet metal 30 which is located close to the surface of the electronic apparatus 1 and is located on the end of the front-side case 3, like the flange 30a, in order to enhance the effect of protection against static electricity.

As illustrated in FIG. 10, the display 120 is bonded to the inner main surface 21 of the cover panel 2 by a bonding member 220. Examples of the bonding member 220 may include a pressure-sensitive adhesive such as an optical adhesive sheet, an adhesive, and the like. Information displayed on the display 120 is visually recognized by the user of the electronic apparatus 1 through the bonding member 220 and the display region 2a of the cover panel 2.

Further, as illustrated in FIGS. 10 to 12, the piezoelectric vibrator 190 is bonded to the inner main surface 21 of the cover panel 2 via a reinforcing panel 240. The cover panel 2 is formed of, for example, acrylic resin. Acrylic resin has hardness which is lower than that of glass, sapphire, or the like. If the cover panel 2 is formed of a material having low hardness such as acrylic resin, the cover panel 2 vibrates excessively in some cases. If the cover panel 2 vibrates excessively, the vibration of the cover panel 2 is likely to vary. Accordingly, if the cover panel 2 is formed of a material having low hardness, sound pressure characteristics of an air conduction sound and a tissue conducted sound transmitted from the cover panel 2 are probably degraded. Specifically, a sound pressure in a specific frequency band is probably lowered, for example. In view of this, the reinforcing panel 240 which is harder than the cover panel 2 is provided between the cover panel 2 and the piezoelectric vibrator 190 to prevent the cover panel 2 from vibrating excessively. This can improve sound pressure characteristics of a sound transmitted from the cover panel 2. The reinforcing panel 240 may be formed of resin containing glass fiber, inorganic filler, and the like. It is preferable that the reinforcing panel 240 be of a size larger than the piezoelectric vibrator 190 in a plan view, in order to transmit vibration of the piezoelectric vibrator 190 to the cover panel 2. Additionally, if the sound pressure characteristics of the sound transmitted from the cover panel 2 can be secured, there is no need to provide the reinforcing panel 240.

The reinforcing panel 240 is bonded to the inner main surface 21 of the cover panel 2 by a bonding member 230. The piezoelectric vibrator 190 is also bonded to the reinforcing panel 240 by a bonding member 250. That is, the piezoelectric vibrator 190 is bonded to the inner main surface 21 of the cover panel 2 via the bonding member 230, the reinforcing panel 240, and the bonding member 250. Examples of the bonding member 230 and the bonding member 250 may include a double-sided tape and an adhesive.

Figure 13:
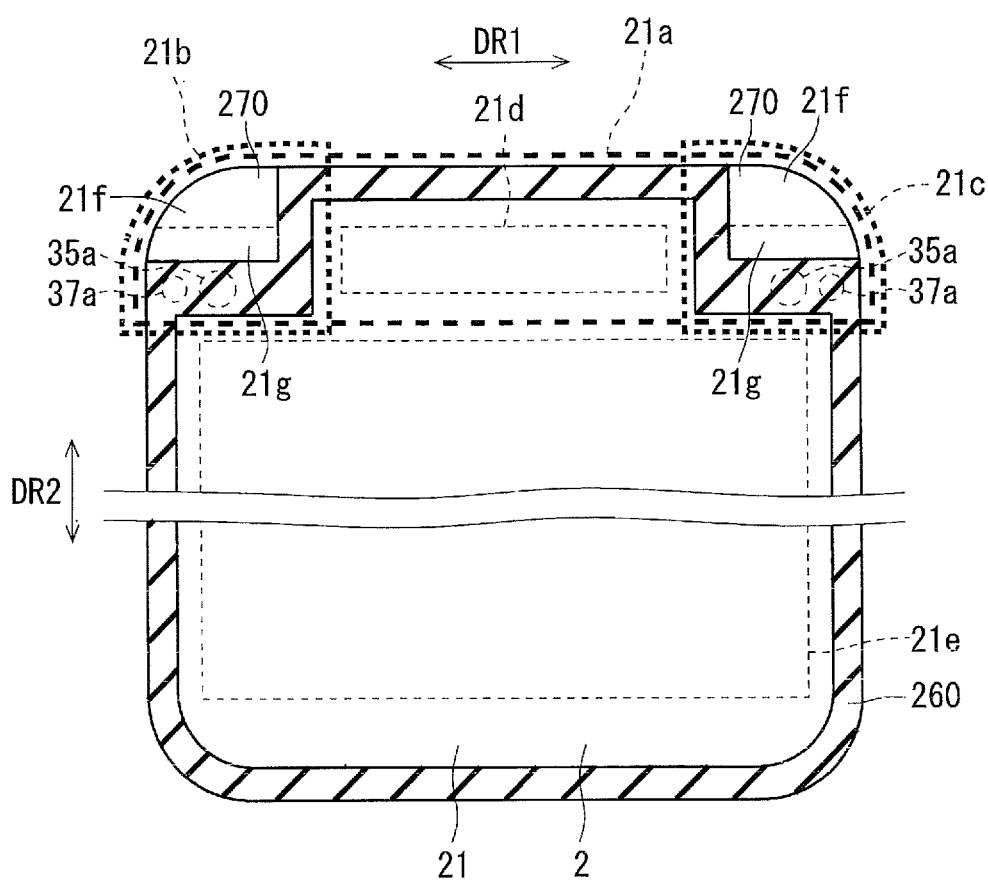
FIG. 13 illustrates a plan view of a cover panel as seen from an inner main surface of the cover panel.
Figure 14:
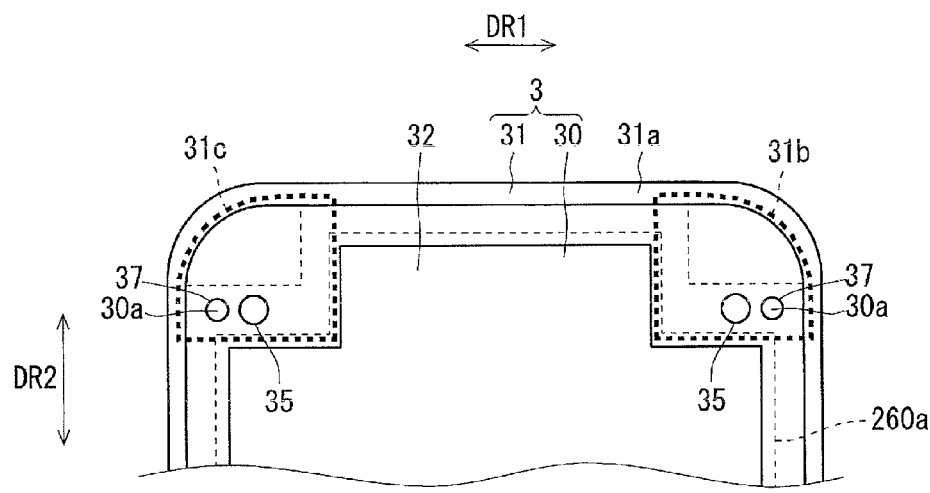
FIG. 14 illustrates a plan view of a front-side case as seen from the cover panel.

FIG. 13 illustrates a plan view of the cover panel 2 as seen from the inner main surface 21 of the cover panel 2. FIG. 14 illustrates a plan view of the front-side case 3 as seen from the cover panel 2. As illustrated in FIG. 13, the inner main surface 21 of the cover panel 2 includes an upper end portion 21a extending in the widthwise direction DR1 in the inner main surface 21. The upper end portion 21a includes an element region 21d where the piezoelectric vibrator 190 is located. Further, the upper end portion 21a has an upper left corner 21b and an upper right corner 21c located on the respective two ends in the widthwise direction DR1, between which the element region 21d is interposed. The inner main surface 21 of the cover panel 2 includes a display region 21e where the display 120 is provided, which is aligned with the upper end portion 21a in the lengthwise direction DR2. Each of the upper end portion 21a, the upper left corner 21b, and the upper right corner 21c forms a partial region of the inner main surface 21.

The piezoelectric vibrator 190 is bonded to the element region 21d via the reinforcing panel 240 such that a center in the lengthwise direction thereof corresponds to a center of the upper end portion 21a of the cover panel 2 in the widthwise direction DR1.

In FIG. 14, regions where the upper left corner 21b and the upper right corner 21c of the cover panel 2 are bonded on the surface, which is located closer to the cover panel 2, of the front-side case 3 are illustrated as an upper right bonding portion 31b and an upper left bonding portion 31c, respectively. Each of the upper right bonding portion 31b and the upper left bonding portion 31c is a surface to which the cover panel 2 is bonded.

As illustrated in FIG. 14, each of the upper right bonding portion 31b and the upper left bonding portion 31c of the front-side case 3 is provided with the screw hole 35 and the exposure hole 37. In FIG. 13, regions, which face the screw holes 35 and the exposure holes 37, on the inner main surface 21 of the cover panel 2 are respectively illustrated as screw-hole facing regions 35a and exposure-hole facing regions 37a. The screw-hole facing region 35a on a lower end portion of the inner main surface 21 of the cover panel 2 is not illustrated.

In FIG. 13, the double-sided tape 260 is denoted as a diagonally shaded region. In FIG. 14, a region 260a where the double-sided tape 260 is bonded in the front-side case 3 is denoted by a dotted line. The double-sided tape 260 is applied to a circumferential edge of the inner main surface 21 of the cover panel 2 so as to surround the element region 21d and the display region 21e.

The double-sided tape 260 can bond all the circumferential edge of the inner main surface 21 of the cover panel 2 to the front-side case 3, for example. Thus, when a waterproof material is used for the double-sided tape 260, a region between the cover panel 2 and the front-side case 3 can be made waterproof. That is, the electronic apparatus 1 can be made waterproof. Additionally, if it is unnecessary to take measures for being waterproof, the double-sided tape 260 needs not be present on all the circumferential edge of the inner main surface 21 of the cover panel 2.

Each of the upper left corner 21b and the upper right corner 21c of the inner main surface 21 of the cover panel 2 includes an adhesive region 21f where the adhesive 270 is provided. Accordingly, each of the adhesive regions 21f is bonded to the front-side case 3 by the adhesive 270. Each of the adhesive regions 21f includes an element facing region 21g which faces the element region 21d in the widthwise direction DR1. The adhesive regions 21f extend to an outer edge of the inner main surface 21 of the cover panel 2, for example. In such a case, the double-sided tape 260 is not present in a region of the inner main surface 21 of the cover panel 2, which is located closer to an outer edge of the cover panel 2 than the adhesive regions 21f.

In the inner main surface 21 of the cover panel 2, the double-sided tape 260 is applied to a region between the adhesive region 21f on the upper left corner 21b and the element region 21d. On the inner main surface 21 of the cover panel 2, the double-sided tape 260 is applied to a region between the adhesive region 21f on the upper left corner 21b and the display region 21e. In an analogous manner, on the inner main surface 21 of the cover panel 2, the double-sided tape 260 is applied to a region between the adhesive region 21f on the upper right corner 21c and the element region 21d. On the inner main surface 21 of the cover panel 2, the double-sided tape 260 is applied to a region between the adhesive region 21f on the upper right corner 21c and the display region 21e.

As described above, if the cover panel 2 is caused to vibrate excessively by the piezoelectric vibrator 190, the sound pressure characteristics of the sound transmitted by the cover panel 2 may probably be degraded.

Here, the piezoelectric vibrator 190 vibrates while being bent in the widthwise direction DR1 of the cover panel 2. Also, the element facing region 21g which faces, in the widthwise direction DR1, the element region 21d where the piezoelectric vibrator 190 is located is bonded to the front-side case 3 by the adhesive 270 having a greater fixing force than the double-sided tape 260. Accordingly, the vibration of the piezoelectric vibrator 190 accompanied with bending in the widthwise direction DR1 is suppressed. This can prevent excessive vibration of the cover panel 2 which is caused by the piezoelectric vibrator 190.

As described above, the adhesive 270 provided on the element facing region 21g has a function of preventing the excessive vibration of the cover panel 2 which is caused by the piezoelectric vibrator 190.

For example, the adhesive 270 is injected between each of the adhesive regions 21f of the cover panel 2 and the front-side case 3 from an adhesive injection hole (not illustrated) formed in the front-side case 3, after the cover panel 2 is bonded to the front-side case 3 by the double-sided tape 260. Thus, the adhesive 270 flows into each of the adhesive regions 21f of the cover panel 2, so that the cover panel 2 and the front-side case 3 are adhered to each other.

Although the adhesive region 21f is provided on each of the upper left corner 21b and the upper right corner 21c of the cover panel 2, the adhesive region 21f may be provided on only one of the upper left corner 21b and the upper right corner 21c. Further, the adhesive region 21f may include only the element facing region 21g.

The double-sided tape 260 is present between the adhesive region 21f and the element region 21d. This makes it possible to prevent the adhesive 270 from flowing toward the piezoelectric vibrator 190 when the adhesive 270 is injected into the adhesive region 21f.

The double-sided tape 260 is present also between the adhesive region 21f and the display region 21e. This makes it possible to prevent the adhesive 270 from flowing toward the display 120 when the adhesive 270 is injected into the adhesive region 21f.

Further, the peripheral portion 31a of the front-side case 3 can prevent the adhesive 270 from flowing out of the cover panel 2 when the adhesive 270 is injected into the adhesive region 21f.

Screw Hole and Exposure Hole

As illustrated in FIG. 14, an opening of the screw hole 35, which is present in the upper right bonding portion 31b of the front-side case 3, is covered with the double-sided tape 260 applied to the upper right bonding portion 31b. Accordingly, as illustrated in FIG. 13, the screw-hole facing region 35a on the upper left corner 21b of the cover panel 2, which is to be bonded to the upper right bonding portion 31b, is located within a region, where the double-sided tape 260 is applied, on the upper left corner 21b.

Likewise, an opening of the screw hole 35, which is present in the upper left bonding portion 31c of the front-side case 3, is covered with the double-sided tape 260 applied to the upper left bonding portion 31c. Accordingly, the screw-hole facing region 35a on the upper right corner 21c of the cover panel 2, which is to be bonded to the upper left bonding portion 31c, is located within a region, where the double-sided tape 260 is applied, on the upper right corner 21c.

As described above, the openings, which are located on the side closer to the cover panel 2, of the screw-holes 35 penetrating the front-side case 3 are covered with the double-sided tape 260, so that dirt or dust can be prevented from intruding into a space between the cover panel 2 and the front-side case 3 from the rear surface 10 of the electronic apparatus 1 through the screw holes 35. In other words, measures for making the electronic apparatus 1 dust-proof can be taken. Since openings, which are located on the side closer to the cover panel 2, of the screw holes 35 are covered with the double-sided tape 260 for bonding the cover panel 2 to the front-side case 3, measures for being dust-proof can be easily taken.

Further, as illustrated in FIG. 14, the opening of the exposure hole 37, which is present in the upper right bonding portion 31b of the front-side case 3, is covered with the double-sided tape 260 applied to the upper right bonding portion 31b. Accordingly, as illustrated in FIG. 13, the exposure-hole facing region 37a on the upper left corner 21b of the cover panel 2, which is to be bonded to the upper right bonding portion 31b, is located within a region, where the double-sided tape 260 is applied, on the upper left corner 21b.

Likewise, the opening of the exposure hole 37, which is present in the upper left bonding portion 31c of the front-side case 3, is covered with the double-sided tape 260 applied to the upper left bonding portion 31c. Accordingly, the exposure-hole facing region 37a on the upper right corner 21c of the cover panel 2, which is to be bonded to the upper left bonding portion 31c, is located within a region, where the double-sided tape 260 is applied, on the upper right corner 21c.

As described above, the exposure holes 37, which are formed in the front-side case 3 and through which the sheet metal 30 is exposed, are covered with the double-sided tape 260, so that dirt or dust can be prevented from intruding into a space between the cover panel 2 and the front-side case 3 through the exposure holes 37. In other words, measures for making the electronic apparatus 1 dust-proof can be taken. Moreover, since the exposure holes 37 formed in the front-side case 3 are covered with the double-sided tape 260 for bonding the cover panel 2 to the front-side case 3, measures for being dust-proof can be easily taken.

In order to make the electronic apparatus 1 waterproof, a waterproof double-sided tape may be employed for the double-sided tape 260. By doing so, it is possible to take measures for making the screw holes 35 and the exposure holes 37 waterproof.

Further, as illustrated in FIG. 13, the screw-hole facing regions 35a are present between the adhesive regions 21f and the display region 21e. Thus, the openings of the screw holes 35, which are located on the side closer to the cover panel 2 and face the screw-hole facing regions 35a, can be covered with a portion of the double-sided tape 260, which is present between the adhesive region 21f and the display region 21e. In other words, the openings, which are located on the side closer to the cover panel 2, of the screw holes 35 can be covered with a portion of the double-sided tape 260, which serves to prevent the adhesive 270 from flowing toward the display 120. Therefore, it is possible to more easily take measures for making the screw holes 35 dust-proof.

As illustrated in FIG. 13, the exposure-hole facing regions 37a are present between the adhesive regions 21f and the display region 21e. Thus, the openings of the exposure holes 37, which are located on the side closer to the cover panel 2 and face the exposure-hole facing regions 37a, can be covered with a portion of the double-sided tape 260, which serves to prevent the adhesive 270 from flowing toward the display 120. Therefore, it is possible to more easily take measures for making the exposure holes 37 dust-proof.

Although there are provided the plurality of screws 36, the screw holes 35, and the screw holes 45 as described above, only one screw hole 36, only one screw hole 35, and only one screw hole 45 may be provided. Although there are provided the plurality of exposure holes 37, only one exposure hole 37 may be provided.

Modifications

Figure 15:
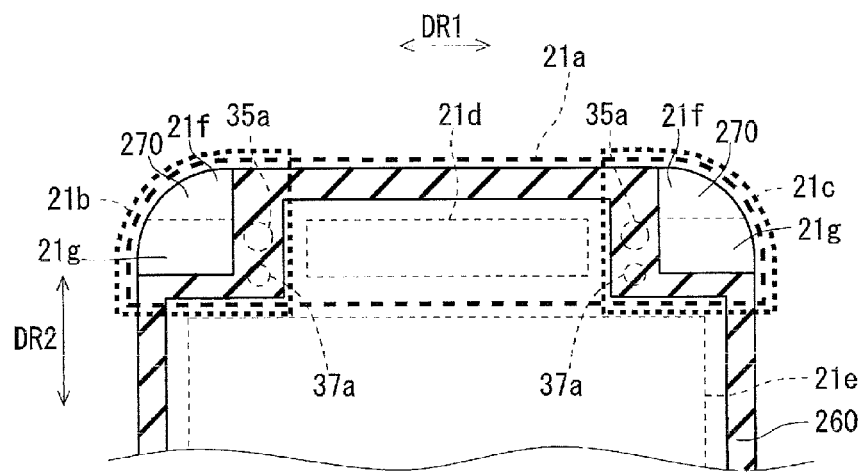
FIG. 15 illustrates a plan view of the cover panel as seen from an inner main surface of the cover panel.

FIG. 15 illustrates a plan view of the cover panel 2 of the electronic apparatus 1 according to one modification, as seen from the inner main surface 21 of the cover panel 2. According to one modification, each of the screw-hole facing region 35a is located between the adhesive region 21f and the element region 21d. Thus, the openings of the screw holes 35, which are located on the side closer to the cover panel 2 and face the screw-hole facing regions 35a, can be covered with a portion of the double-sided tape 260, which is present between the adhesive region 21f and the element region 21d. In other words, the openings, which are located on the side closer to the cover panel 2, of the screw holes 35 can be covered with a portion of the double-sided tape 260, which serves to prevent the adhesive 270 from flowing toward the piezoelectric vibrator 190. Therefore, it is possible to more easily take measures for being the screw holes 35 dust-proof.

Each of the exposure-hole facing regions 37a is located between the adhesive region 21f and the element region 21d. Thus, the openings of the exposure holes 37, which are located on the side closer to the cover panel 2 and face the exposure-hole facing regions 37a, can be covered with a portion of the double-sided tape 260, which serves to prevent the adhesive 270 from flowing toward the piezoelectric vibrator 190. Therefore, it is possible to more easily take measures for being the exposure holes 37 dust-proof.

Although the screw-hole facing regions 35a and the exposure-hole facing regions 37a are placed adjacent to each other as described above, those regions may be placed separately. For example, those regions may be placed such that the screw-hole facing regions 35a are provided between the adhesive regions 21f and the element region 21d whereas the exposure-hole facing regions 37a are provided between the adhesive regions 21f and the display region 21e.

As described above, the present disclosure is applied to a mobile phone; however, the present disclosure is also applicable to other electronic apparatuses. For example, the present disclosure is also applicable to a tablet terminal, a wearable-type electronic apparatus which is put on an arm or the like, and the like. Although in embodiments of the present disclosure, description has been made by taking a folding mobile phone as an example of a mobile phone, the present disclosure is also applicable to mobile phones of other types. For example, the present disclosure is also applicable to a mobile phone which can accept a touch operation or a proximity operation, such as a smartphone, or the like. Although in embodiments of the present disclosure, description has been made by taking a mobile phone including a plurality of operation keys which are located separately from a display, as an example of a mobile phone, the present disclosure is also applicable to a mobile phone of the above-described type, i.e., a mobile phone which can accept a touch operation or a proximity operation, in which a plurality of operation keys are not provided in a front surface thereof, and instead, software keys capable of performing a touch operation or a proximity operation, or the like are displayed on a display.

In the above description, the electronic apparatus 1 is described in detail, but the above description is the exemplification in all aspects and embodiments of the present disclosure are not intended to be limited thereto. In addition, various modifications described above are applicable in combination as long as they are not mutually inconsistent. And, it is construed that numerous modifications which are not exemplified can be envisaged without departing from the scope of the present disclosure.

The invention claimed is:

1. An electronic apparatus comprising:
   a panel including a first surface and a second surface opposite to the first surface;
   a piezoelectric vibrator located on a first end portion of the second surface, in, and configured to vibrate while being bent in a first direction, the first end portion extending in the first direction;
   a first case facing the panel, the panel being attached to the first case;
   a double-sided tape located between the panel and the first case, and configured to bond the panel to the first case; and
   an adhesive located between the panel and the first case, and configured to bond the panel to the first case,
   wherein
   the first end portion includes an element region where the piezoelectric vibrator is present, and includes second and third end portions in the first direction with the element region interposed between the second and third end portions,
   the second end portion faces the element region in the first direction, and includes a first adhesive region where the adhesive is present, and
   the double-sided tape is present between the first adhesive region and the element region, and is not present in a region located closer to an outer edge of the panel than the first adhesive region.

2. The electronic apparatus according to claim 1, wherein the first case includes a first screw hole penetrating in a thickness direction of the first case and reaching a first bonding region, where the second end portion is bonded, of the first case,
   a first screw is inserted into the first screw hole, and
   the first screw hole includes an opening on a side closer to the panel, the opening being covered with the double-sided tape.

3. The electronic apparatus according to claim 2, wherein the second surface includes a region facing the first screw hole, the region being located between the first adhesive region and the element region.

4. The electronic apparatus according to claim 2, further comprising
   a display located on the second surface,
   wherein
   the second surface includes a display region where the display is located, the display region being aligned with the first end portion in a second direction parallel to the first and second surfaces and perpendicular to the first direction, and
   the double-sided tape is present between the first adhesive region and the display region.

5. The electronic apparatus according to claim 4, wherein the second surface includes a region facing the first screw hole, the region being located between the first adhesive region and the display region.

6. The electronic apparatus according to claim 2, further comprising a second case to be attached to the first case from a side opposite to the panel, wherein the first screw is inserted into the first screw hole from the side opposite to the panel to attach the second case to the first case.

7. The electronic apparatus according to claim 2, wherein the third end portion faces the element region in the first direction, and includes a second adhesive region where the adhesive is present, the first case includes a second screw hole penetrating in the thickness direction of the first case and reaching a second bonding region, where the third end portion is bonded, of the first case, a second screw is inserted into the second screw hole, and the second screw hole includes an opening on a side closer to the panel, the opening being covered with the double-sided tape.

8. The electronic apparatus according to claim 1, wherein the first case includes a sheet metal formed integrally with the first case, the first case includes an exposure hole from which the sheet metal is exposed to the first bonding region, and the exposure hole is covered with the double-sided tape.

9. The electronic apparatus according to claim 1, wherein the panel is formed of an acrylic resin.

\* \* \* \* \*